United States Patent
Huang et al.

(10) Patent No.: US 12,444,043 B2
(45) Date of Patent: Oct. 14, 2025

(54) NON-CONTACT DETECTION DEVICE AND DETECTION METHOD THEREOF

(71) Applicant: INDUSTRIAL TECHNOLOGY RESEARCH INSTITUTE, Hsinchu (TW)

(72) Inventors: Wei-Shiang Huang, Tainan (TW); Tsai-Ling Kao, Tainan (TW); Chun-Yi Lee, Chiayi (TW); Jhe-Ruei Li, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 390 days.

(21) Appl. No.: 18/093,917

(22) Filed: Jan. 6, 2023

(65) Prior Publication Data

US 2024/0153068 A1    May 9, 2024

(30) Foreign Application Priority Data

Nov. 9, 2022    (TW)    ................................. 111142796

(51) Int. Cl.
*G01B 11/26*    (2006.01)
*G06T 7/00*    (2017.01)

(52) U.S. Cl.
CPC .... *G06T 7/001* (2013.01); *G06T 2207/30164* (2013.01)

(58) Field of Classification Search
CPC .......... G06T 7/001; G06T 2207/30164; G01B 11/26; G01B 11/28
See application file for complete search history.

(56) References Cited

U.S. PATENT DOCUMENTS

| | | | | |
|---|---|---|---|---|
| 5,204,911 | A * | 4/1993 | Schwartz | ................ G06T 7/001 |
| | | | | 382/168 |
| 10,613,037 | B2 * | 4/2020 | Nagata | ............. G01N 21/95684 |
| 2008/0079936 | A1 | 4/2008 | Kinney et al. | |

(Continued)

FOREIGN PATENT DOCUMENTS

| | | |
|---|---|---|
| CN | 102384729 A | 3/2012 |
| CN | 204115643 U | 1/2015 |
| CN | 112013799 A | 12/2020 |

(Continued)

OTHER PUBLICATIONS

Lin, C. F., Lin, S. F., Hwang, C. H., Tu, H. K., Chen, C. Y., & Weng, C. J. (2018). Real-time image-based defect inspection system of internal thread for nut. IEEE Transactions on Instrumentation and Measurement, 68(8), 2830-2848. (Year: 2018).*

Belaid, A. (Jun. 1990). Metrology in quality control of nuts. In [1990] Proceedings. 10th International Conference on Pattern Recognition (vol. 1, pp. 636-638). IEEE. (Year: 1990).*

(Continued)

*Primary Examiner* — Gregory A Morse
*Assistant Examiner* — Renae A Bitor
(74) *Attorney, Agent, or Firm* — Birch, Stewart, Kolasch & Birch, LLP

(57) ABSTRACT

A non-contact detection method for a nut is provided. The method includes the following steps. The nut is photographed to obtain a threaded hole image of the nut. A thread area comparison between the threaded hole image and a standard threaded hole image is performed. An area difference is obtained according to the result of the thread area comparison. Whether the nut is a good nut is determined according to the area difference.

16 Claims, 6 Drawing Sheets

(56) References Cited

U.S. PATENT DOCUMENTS

2020/0360968 A1* 11/2020 Nygaard ............... B07C 5/3416
2025/0027768 A1* 1/2025 Nakanishi ................. G01L 5/00

FOREIGN PATENT DOCUMENTS

| CN | 112102272 A | | 12/2020 |
| CN | 112907514 A | | 6/2021 |
| JP | 2009121919 A | * | 6/2009 |
| JP | 4910800 B2 | * | 4/2012 |
| TW | M305898 U | | 2/2007 |
| TW | 201710671 A | | 3/2017 |
| TW | M575098 U | | 3/2019 |
| TW | 202135976 A | | 10/2021 |
| TW | 202221560 A | | 6/2022 |

OTHER PUBLICATIONS

Xutao, Z., Feng, G., Yan, L. I., Lixin, H., & Linqi, S. (Oct. 2017). Research on non-contact measurement method of ball screw nut based on spectral confocal principle. In 2017 13th IEEE International Conference on Electronic Measurement & Instruments (ICEMI) (pp. 493-498). IEEE. (Year: 2017).*

Taiwanese Office Action and Search Report for Taiwanese Application No. 111142796, dated Dec. 25, 2023.

Feng et al., "Research on application of corner detection in thread vision measurement", Journal of Physics: Conference Series, 2021, 1812, Jan. 2020, total 9 pages.

Kosarevsky et al., "Detection of screw threads in computed tomography 3D density fields", Jun. 26, 2013, total 7 pages.

Perng et al., "A novel internal thread defect auto-inspection system", Int J Adv Manuf Technol, (2010), vol. 47, p. 731-743.

* cited by examiner

NON-CONTACT DETECTION DEVICE AND DETECTION METHOD THEREOF

This application claims the benefit of Taiwan application Serial No. 111142796, filed Nov. 9, 2022, the disclosure of which is incorporated by reference herein in its entirety.

TECHNICAL FIELD

The disclosure relates in general to a detection device and a detection method thereof, and more particularly to a non-contact detection device and a detection method thereof.

BACKGROUND

The nut is a commonly seen locking element. During the tapping process, if the verticality of the threaded hole in the nut is poor, the nut and its locking screw cannot be tightly engaged, and the nut may easily come off the element and break during the operation of a machine.

According to the current nut detection method, whether the verticality of the threaded hole of a nut matches the standards or not is determined using a locking standard screw or a gauge. However, such detection method is time-consuming and can only detect the nuts through sampling. If such detection method is used over a lengthy period of time, the standard screw will be abraded, and therefore will require correction and maintenance. Thus, the above detection method cannot meet the detection requirement of being fast in time and lots of volume.

SUMMARY

The present disclosure relates to a non-contact detection device and a detection method for a nut thereof capable of increasing detection efficiency without using standard screw or gauge.

According to one embodiment, a non-contact detection method for a nut is provided. The method includes the following steps. The nut is photographed to obtain a threaded hole image of the nut. A thread area comparison between the threaded hole image and a standard threaded hole image is performed. An area difference is obtained according to a result of the thread area comparison. Whether the nut is a good nut is determined according to the area difference.

According to another embodiment, a non-contact detection device for a nut is provided. The non-contact detection device includes an image capturing device and a processor. The image capturing device captures a threaded hole image of the nut. The processor obtains the threaded hole image of the nut, performs a thread area comparison between the threaded hole image and a standard threaded hole image to obtain an area difference, and determines whether the nut is a good nut according to the area difference.

The above and other aspects of the disclosure will become better understood with regard to the following detailed description of the preferred but non-limiting embodiment(s). The following description is made with reference to the accompanying drawings.

Figure 1:
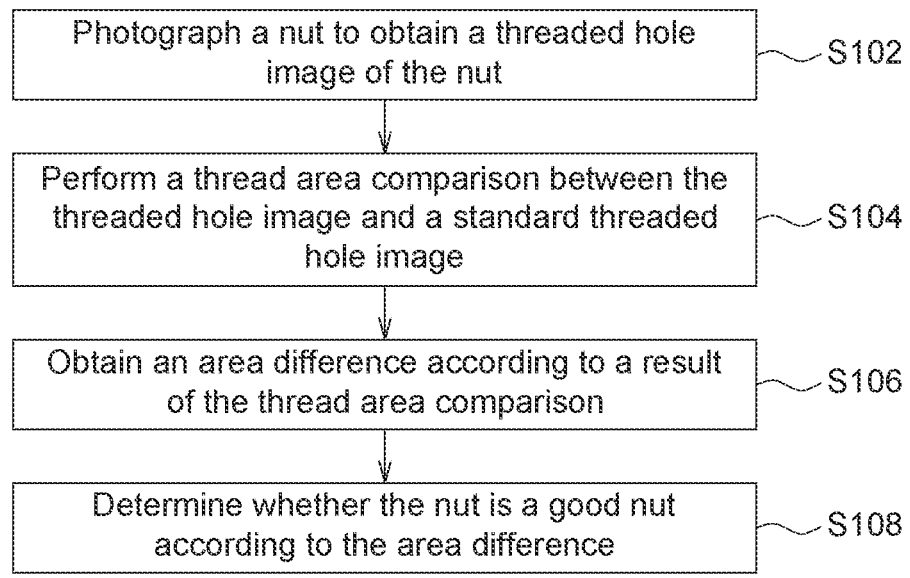
FIG. 1 is a schematic diagram of a non-contact detection method according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical solutions for the embodiments of the present application are clearly and thoroughly disclosed with accompanying drawings. Obviously, the embodiments disclosed below are only some rather than all of the embodiments of the present application. All embodiments obtained by anyone ordinarily skilled in the technology field of the present application according to the disclosed embodiments of the present application are within the scope of protection of the present disclosure if the obtained embodiments lack innovative labor. Similar/identical designations are used to indicate similar/identical elements.

Figure 2:
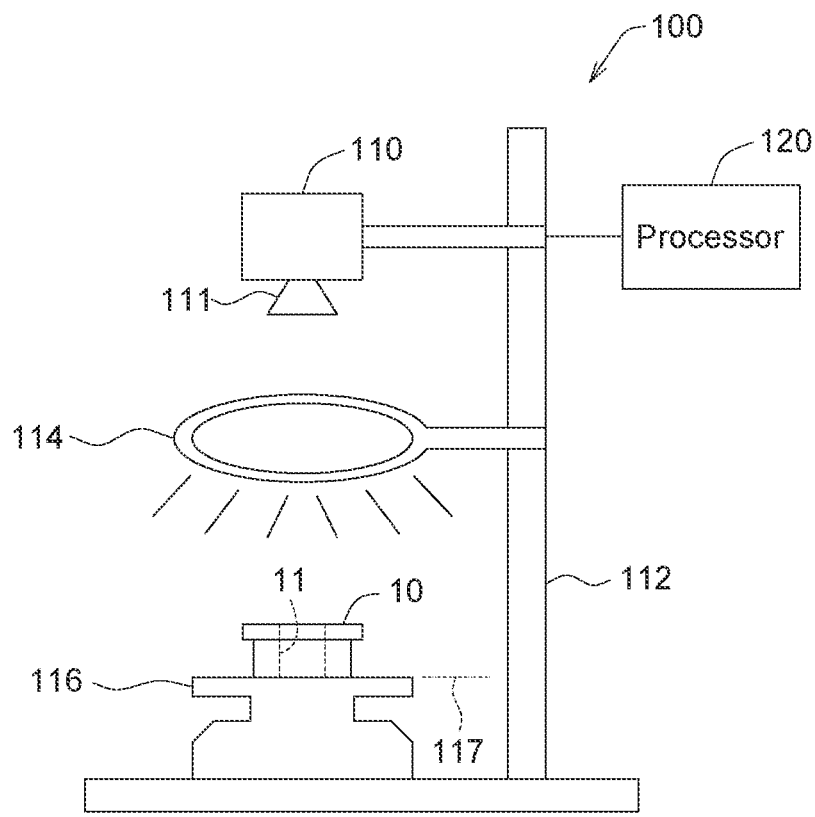
FIG. 2 is a schematic diagram of a non-contact detection device according to an embodiment of the present disclosure.

Refer to FIGS. 1 and 2. FIG. 1 is a schematic diagram of a non-contact detection method according to an embodiment of the present disclosure. FIG. 2 is a schematic diagram of a non-contact detection device according to an embodiment of the present disclosure. In the present embodiment, the non-contact detection device 100 is configured to detect a nut 10 and to perform classification according to a threaded hole image M1 of the nut 10 to obtain a quality detection result. The thread of the nut 10 is formed using a tapping machine. If the verticality of the threaded hole 11 tilts during the tapping process, the nut 10 cannot be tightly engaged with the locking screw. In order to quickly detect whether the verticality of the threaded hole 11 in the nut 10 matches the standards, a non-contact detection device and a detection method thereof are provided below.

The non-contact detection method includes steps S102-S108. In step S102, a nut 10 is photographed to obtain a threaded hole image of the nut 10. In step S104, a thread area comparison between the threaded hole image and a standard threaded hole image is performed. In step S106, an area difference is obtained according to the result of the thread area comparison. In step S108, whether the nut 10 is a good nut is determined according to the area difference.

Details of the method are as follows. A platform 116 of an image capturing mechanism is adjusted, so that the bottom side of the platform 116 and the camera lens 111 are at a level state. The nut 10 is placed on the platform 116, which is separated from the camera by a distance. The photographing method of the nut 10 includes the following steps. The bottom side of the nut 10 is placed in parallel with the horizontal reference plane 117 of the platform 116, the nut 10 is located right beneath the camera, and the camera lens 111 is collimated and aligned with the center of the nut 10. Besides, the annular light source 114, disposed between the camera lens 111 and the platform 116, provides a uniform light to uniformly illuminate the surface of the nut 10. After the annular light source 114 is turned on to uniformly illuminate the surface of the nut 10, the nut 10 is photographed, so that the image of the threaded hole 11 in the nut 10 can be stored and used for subsequent angle comparison and thread area comparison.

Figure 3A:
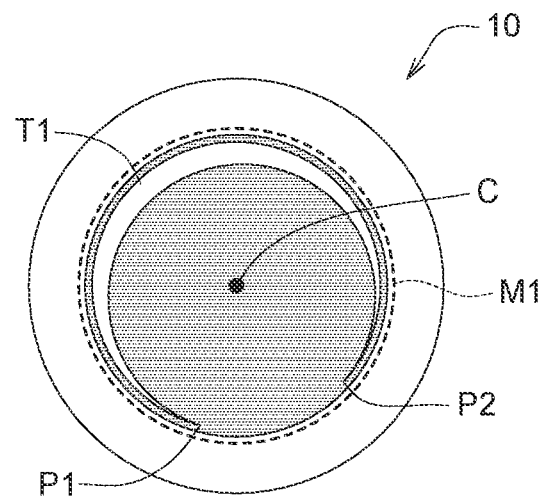
FIGS. 3A and 3B respectively are schematic diagrams of a threaded hole image of a to-be-detected nut and a threaded hole image of a standard nut.
Figure 3B:
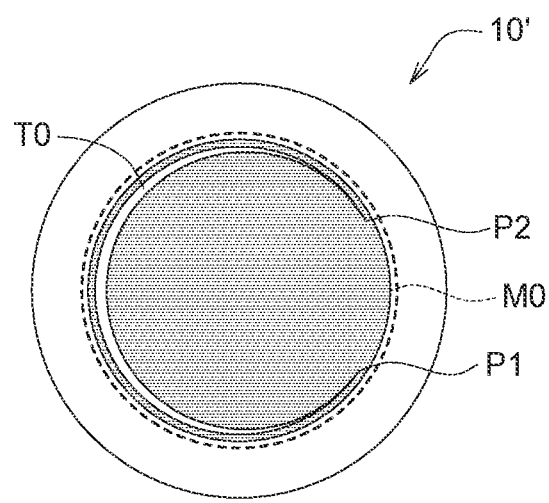

As indicated in FIGS. 2, 3A and 3B, the non-contact detection device 100 includes an image capturing device 110 and a processor 120. The image capturing device 110 is configured to photograph a threaded hole image M1 of the nut 10. The processor 120 is configured to obtain the threaded hole image M1 of the nut 10, perform a thread area comparison between the threaded hole image M1 and a standard threaded hole image M0 to obtain an area difference, and determine whether the nut 10 is a good nut according to the area difference.

As indicated in FIGS. 2, 3A and 3B, the image capturing device 110, which can be realized by a camera, is arranged on an upright rod 112. The processor 120 is connected to the image capturing device 110 to receive the image of the threaded hole 11 in the nut 10. The processor 120 may include an image processing module (not illustrated in the diagram) configured to overlap and align a standard threaded hole image M0 of the nut 10' and a threaded hole image M1 of a to-be-detected nut 10 for calculating the thread area difference, wherein it is already known that the nut 10' is a good nut. In the present embodiment, image processing is not limited to image overlapping. For instance, the thread cutting trajectory of the standard threaded hole image M0 of a good nut is compared with the thread cutting trajectory of the threaded hole image M1 of a to-be-detected nut 10 obtained at the same angle using the line connecting the circle center O of the nut 10 and the entry point P1 of thread cutting as the reference line for calculating the thread area difference.

Referring to FIGS. 3A and 3B, schematic diagrams of a threaded hole image M1 of a to-be-detected nut 10 and a threaded hole image M0 of a standard nut 10' are respectively shown. FIG. 3A is a threaded hole image M1 of a to-be-detected nut 10 (represented by a dotted circle) photographed at a vertical angle. FIG. 3B is a threaded hole image M0 of a standard nut 10' (represented by a dotted circle) photographed at a vertical angle. Both images show the entry point P1 and the submerge point P2 of the thread cutting trajectory of the nut 10. The entry point P1 is the entry point at which the cutting tool taps the nut 10; the submerge point P2 is the terminal point of the first ring of threads at which the cutting tool enters the second ring of threads.

The thread cutting trajectory is helical, and extends from one end of the nut 10 to the other end along the axial direction in a helical manner. Under normal circumstances as indicated in FIG. 3B where the standard nut 10' is photographed from right above, since the thread cutting trajectory does not have serious inclination, the cutting tool starts tapping the nut from the entry point P1, and after a predetermined angle, the thread cutting trajectory cannot be seen, that is, the thread cutting trajectory for the second ring of threads cannot be seen from the submerge point P2 onwards. The standard threaded hole image M0 of FIG. 3B shows that the ratio of the area TO representing the thread cutting trajectory (the area of the white region) to the total area of the threaded hole image M0 (the area of the circular hole) is small. The result shows that the inclination of the thread cutting trajectory is obtained when the thread hole maintains a certain level of verticality, and the requirement of a good nut is matched.

However, under the circumstance where the thread cutting trajectory has inclination as indicated in FIG. 3A, the thread cutting trajectory of the second ring and onwards still can be seen after the submerge point P2, so that the ratio of the area T1 representing the thread cutting trajectory (the area of the white region) to the total area of the threaded hole image M1 (the area of the circular hole) increases. The result shows that the inclination of the thread cutting trajectory is obtained when the thread hole cannot maintain a certain level of verticality, and the requirement of a good nut is not matched.

The verticality of the threaded hole is relevant to the inclination of the thread cutting trajectory. When the threaded hole has a poor verticality and causes the thread cutting trajectory to be inclined, the problem of the nut 10 failing to be tightly engaged with the locking screw may arise. In the present embodiment, through a thread area comparison between the threaded hole image M1 of the to-be-detected nut 10 and a standard threaded hole image M0, the thread area difference generated due to the inclination of the thread cutting trajectory is calculated for determining whether the nut 10 is a good nut.

Figure 4A:
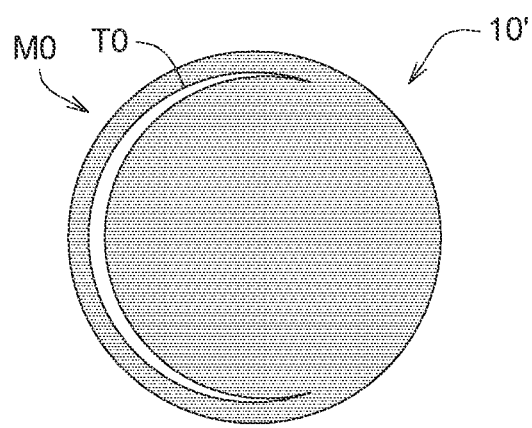
FIGS. 4A to 4E are schematic diagrams of obtaining an area difference according to the result of thread area comparison.
Figure 4B:
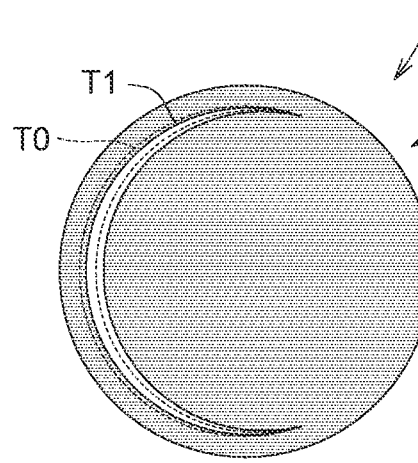
Figure 4C:
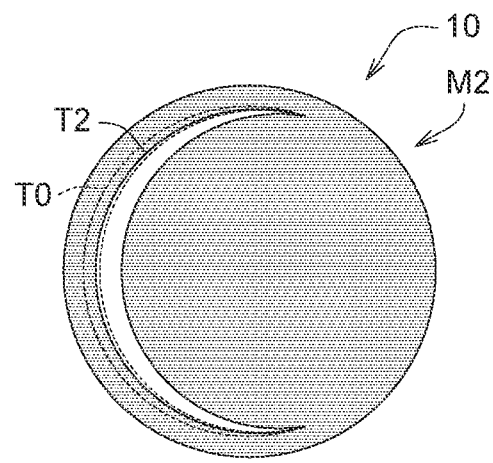

Referring to FIGS. 4A to 4E, schematic diagrams of obtaining an area difference according to the result of thread area comparison are shown. FIG. 4A is a schematic diagram of a threaded hole image M0 of a standard nut 10'. FIGS. 4B and 4C respectively are schematic diagrams of a first threaded hole image M1 and a second threaded hole image M2 of two to-be-detected nuts 10. A comparison of FIGS. 4A-4C shows that the area T1 representing the thread cutting trajectory as shown in the first threaded hole image M1 is smaller than the area T2 representing the thread cutting trajectory as shown in the second threaded hole image M2; and the area T1 representing the thread cutting trajectory as shown in the first threaded hole image M1 can be greater than or equivalent to the area TO representing the thread cutting trajectory as shown in the standard threaded hole image M0, that is, T0≤T1<T2.

Figure 4D:
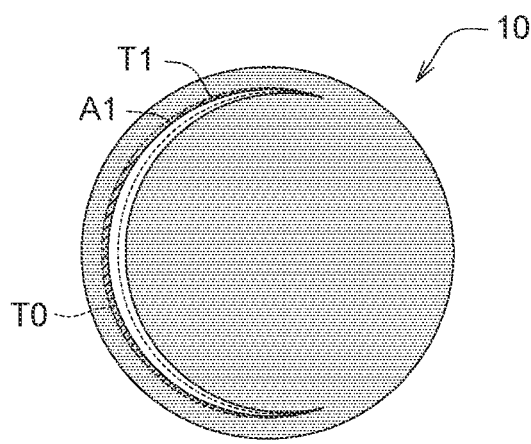
Figure 4E:
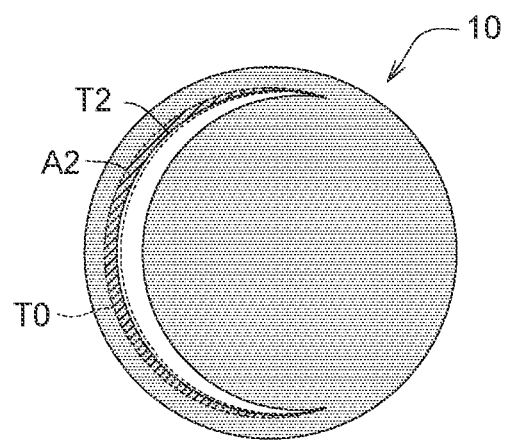

Besides, FIGS. 4D and 4E show the thread area differences A1 and A2 of two to-be-detected nuts 10 obtained through a comparison with the standard nut 10'. As indicated in FIGS. 4D and 4E, the thread area differences are areas A1 and A2, that is, the area of the non-overlapped region outside the overlapped region of respective thread cutting trajectory in each of the two threaded hole images. The larger the thread area difference, the larger the inclination of the thread cutting trajectory, and the poorer the verticality of the threaded hole. Conversely, the smaller the thread area difference, the better the verticality of the threaded hole.

In the present embodiment, the thread area difference can be represented by the pixel volume in the non-overlapped region in the above comparison; the larger the pixel volume, the larger the area difference; conversely, the smaller the pixel volume, the smaller the area difference.

Figure 5:
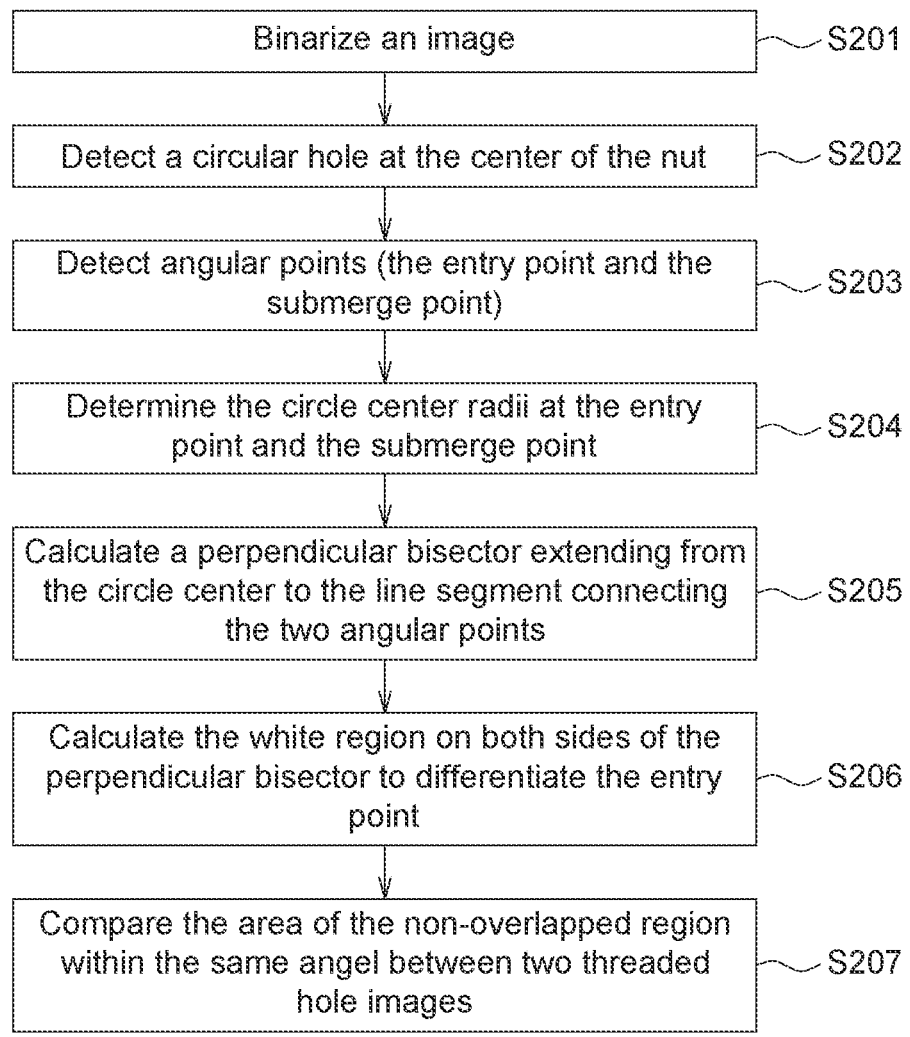
FIG. 5 is a flowchart of a processing method for a threaded hole image according to an embodiment of the present disclosure.
Figure 6A:
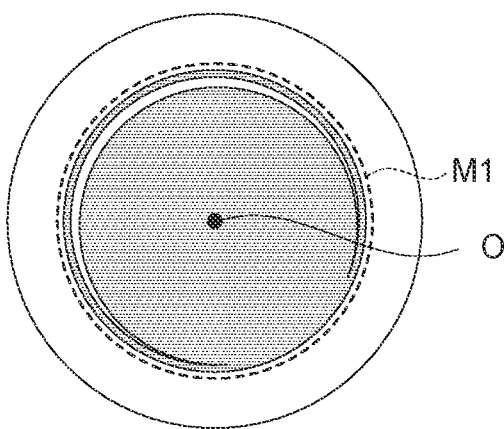
FIGS. 6A to 6E are schematic diagrams of a processing method of a threaded hole image.
Figure 6B:
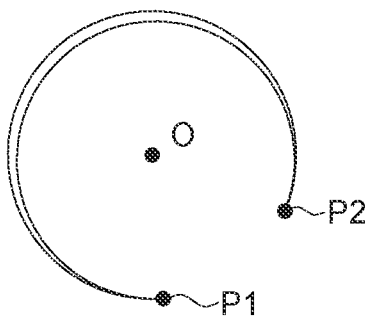
Figure 6C:
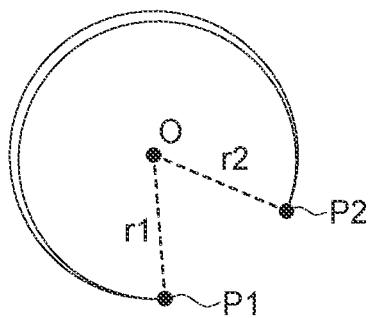
Figure 6D:
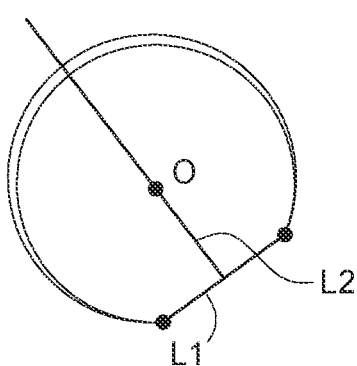
Figure 6E:
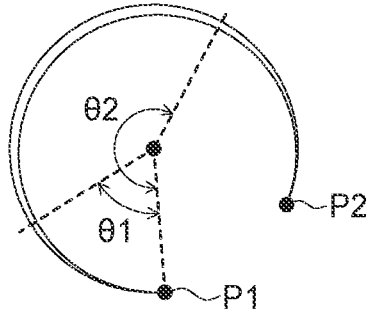

Refer to FIG. 5 and FIGS. 6A-6E. FIG. 5 is a flowchart of a processing method for a threaded hole image M1 according to an embodiment of the present disclosure. FIGS. 6A-6E are schematic diagrams of a processing method of a threaded hole image M1. Firstly, in step S201, an image of a nut is binarized to obtain a black and white image. Next, in step S202, a circular hole at the center of the nut is detected to obtain an image of the thread cutting trajectory (that is, the threaded hole image M1), and the position of the circle center O is calculated. In step S203, angular points on the thread cutting trajectory are detected to obtain the positions of the entry point P1 and the submerge point P2. In step S204, the circle center radius $r_1$ at the entry point P1 and the circle center radius $r_2$ at the submerge point P2 are calculated and the difference between the circle center radius $r_1$ and the circle center radius $r_2$ is determined. Generally speaking, the circle center radius $r_1$ is obtained is the entry point P1 is larger than the circle center radius $r_2$ obtained at the submerge point P2. In step S205, the perpendicular bisector L2 extending from the circle center O to the line segment L1 connecting the two angular points is calculated and is used to divide the thread cutting trajectory into two blocks. In step S206, the white region in each block (the thread cutting trajectory) is calculated, so that the positions of the entry point P1 and the submerge point P2 can be differentiated. The white region of the block at which entry point P1 is located is larger than the white region of the block at which the submerge point P2 is located. In step S207, the area A1 of the non-overlapped region within an angle between the threaded hole image M1 is compared with the area A1 of the non-overlapped region within the same angle in the threaded hole image M0 using the line segment connecting the circle center O and the entry point P1 as a reference line. The scope of comparison ranges from angle θ1 to angle θ2; the angles θ1 and θ2 depend on the scope of comparison determined according to the type of the nut.

In the present embodiment, the area A1 of the non-overlapped region (that is, the area difference) can be classified according to a threshold. If the area difference is greater than the predetermined threshold, this indicates that the thread cutting trajectory has a larger inclination and the threaded hole has a poorer verticality, and the nut 10 of such type is classified as a defective nut. Conversely, if the area difference is less than or equivalent to the predetermined threshold, this indicates that the thread cutting trajectory has a smaller inclination and the threaded hole has a better verticality, and the nut 10 of such type is classified as a good nut. The predetermined threshold can be represented by a pixel volume threshold such as 2500 or other value. If the pixel volume of the non-overlapped region is less than or equivalent to the pixel volume threshold, this indicates that the nut is a good nut; if the pixel volume of the non-overlapped region is greater than the pixel volume threshold, this indicates that the nut s a defective nut.

Figure 7A:
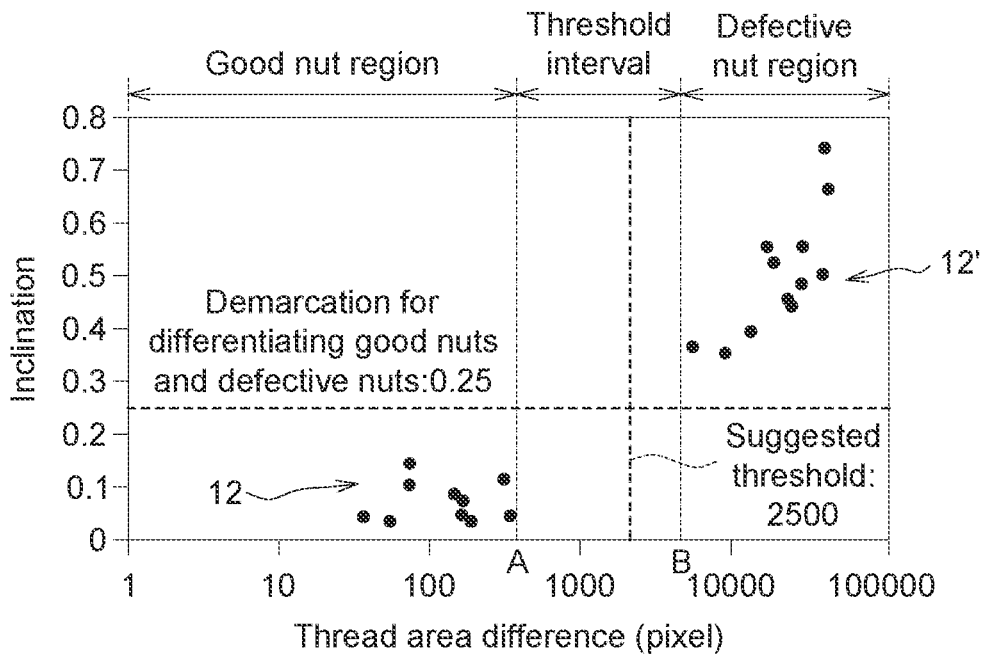
FIGS. 7A and 7B respectively are schematic diagrams of determining the qualities of two types of nuts according to the area difference.
Figure 7B:
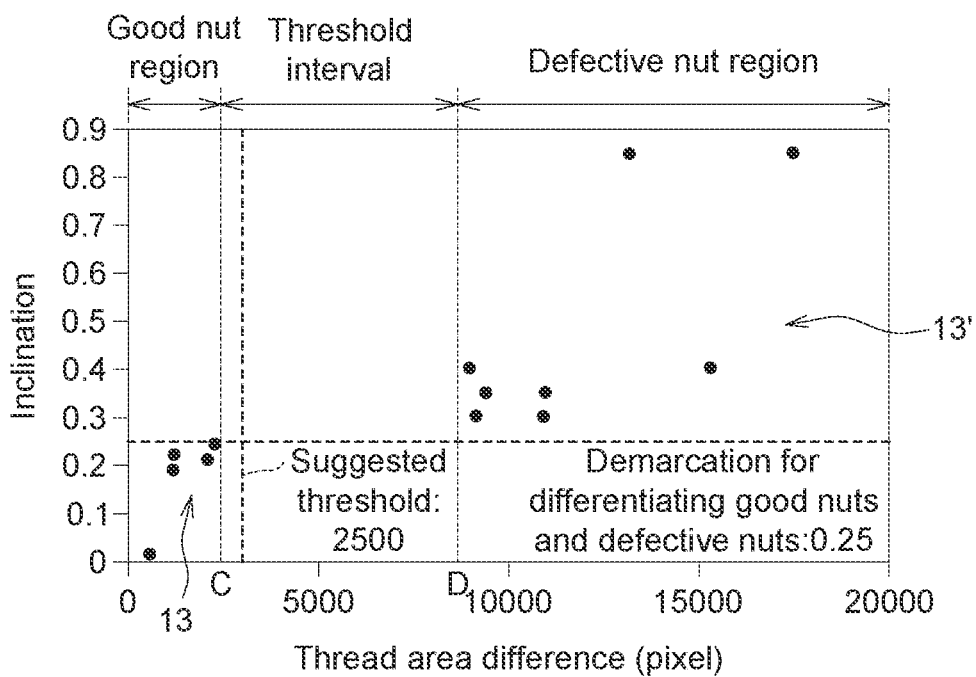

Referring to FIGS. 7A and 7B, schematic diagrams of determining the quality of two types of nuts 10 according to the area difference are respectively shown. FIG. 7A illustrates a statistical result of thread area difference of the first type of nut 10. FIG. 7B illustrates a statistical result of thread area difference of the second type of nut 10. In the present embodiment, the area differences of good nuts 12 and defective nuts 12' in a batch are recorded, and a threshold interval (or a pixel volume threshold) can be calculated using statistical methods and used as a standard for classifying the nuts 10 manufactured in subsequent batches.

For instance, in an embodiment, the inclination demarcation for differentiating the good nuts 12 and the defective nuts 12' is set to 0.25. As indicated in FIG. 7A, according to the threaded hole images of the first type of nuts, that is, the good nut 12 and the defective nut 12', the thread area difference of the good nut 12 is distributed at the bottom left region (the maximum of the area difference for differentiating the good nuts 12 is numeric value A), and the thread area difference of the defective nut 12' is distributed at the top right region (the minimum of the area difference for differentiating the defective nuts 12' is numeric value B), wherein the threshold interval (or the pixel volume threshold) is between numeric value A and numeric value B, then the average threshold, that is, (A+B)/2, can be used as a demarcation of the good nuts 12 and the defective nuts 12'.

Whether the first type of nuts manufactured in subsequent batches is a good nut or a defective nut can be determined according to whether the area difference is less than or greater than the threshold interval or the average threshold, and there is no need to re-set the threshold interval or the average threshold.

Likewise, as indicated in FIG. 7B, according to the threaded hole images of the second type of nuts, that is, the good nut 13 and the defective nut 13', the thread area difference of the good nut 13 is distributed at the bottom left region (the maximum of the area difference for differentiating the good nuts 13 is numeric value C) and the thread area difference of the defective nuts 13' is distributed at the top right region (the minimum of the area difference for differentiating the defective nuts 13' is numeric value D), wherein the threshold interval (or the pixel volume threshold) is between numeric value C and numeric value D, then the average threshold, that is, (C+D)/2, can be used as a demarcation of the good nuts 13 and the defective nuts 13'.

Like the first type of nuts, whether the second type of nuts manufactured in subsequent batches is a good nut or a defective nut can be determined according to whether the area difference is less than or greater than the threshold interval or the average threshold, and there is no need to re-set the threshold interval or the average threshold.

According to the non-contact detection device for a nut and the detection method thereof disclosed in above embodiments of the present disclosure, classification of a nut is performed according to the threaded hole image of the nut to obtain a quality detection result. In the present embodiment, the thread area of the thread cutting trajectory formed in the threaded hole image can be captured, the image of a good nut and the image of the to-be-detected nut are overlapped and are aligned using respective entry point as a reference, and the thread area difference outside the overlapped region is compared between the two images to obtain the pixel volume of the non-overlapped region. Thus, whether the to-be-detected nut is a good nut or a defective nut can be determined without using any standard screw or gauge, and the detection efficiency can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A non-contact detection method for a nut, comprising:
photographing the nut to obtain a threaded hole image of the nut;
performing a thread area comparison between the threaded hole image and a standard threaded hole image;
calculating an area difference based on a comparison result of the thread area comparison; and
analyzing the area difference based on a correlation between an inclination of a thread cutting path and an alignment of a threaded hole axis, to determine whether a structural deviation exists in a geometry of the thread.

2. The non-contact detection method according to claim 1, wherein photographing the nut comprises placing the nut on a platform, so that a bottom side of the nut is parallel with a horizontal reference plane of the platform, and a camera lens is collimated and aligned with a center of the nut to photograph the nut.

3. The non-contact detection method according to claim 1, wherein the thread area comparison comprises overlapping and aligning the threaded hole image and the standard threaded hole image for calculating the area difference of the threads in a non-overlapped region outside the overlapped region.

4. The non-contact detection method according to claim 3, wherein the thread area comparison comprises comparing a thread cutting trajectory of the standard threaded hole image with a thread cutting trajectory of the threaded hole image obtained at a same angle using a line connecting a circle center of the nut and an entry point of thread cutting as a reference line for calculating the area difference.

5. The non-contact detection method according to claim 4, wherein the entry point of the thread cutting trajectory is an entry point via which a cutting tool taps the nut.

6. The non-contact detection method according to claim 3, wherein the area difference is represented by a pixel volume in the non-overlapped region obtained after the thread area comparison is performed.

7. The non-contact detection method according to claim 1, wherein analyzing the area difference comprises setting a pixel volume threshold, and determining that the structural deviation exists in the geometry of the thread if the area difference exceeds the pixel volume threshold.

8. A non-contact detection device for a nut, wherein the non-contact detection device comprises:
 an image capturing device configured to photograph a threaded hole image of the nut; and
 a processor configured to obtain the threaded hole image of the nut, perform a thread area comparison between the threaded hole image and a standard threaded hole image to calculate an area difference, and analyze the area difference based on a correlation between an inclination of a thread cutting path and an alignment of a threaded hole axis, to determine whether a structural deviation exists in a geometry of the thread.

9. The non-contact detection device according to claim 8, further comprising a platform, wherein the nut is placed on the platform, a bottom side of the nut is parallel with a horizontal reference plane of the platform, and the image capturing device comprises a lens collimated and aligned with a center of the nut to photograph the nut.

10. The non-contact detection device according to claim 8, wherein the thread area comparison comprises overlapping and aligning the threaded hole image and the standard threaded hole image for calculating the area difference of the threads in a non-overlapped region outside the overlapped region.

11. The non-contact detection device according to claim 10, wherein the thread area comparison comprises comparing a thread cutting trajectory of the standard threaded hole image with a thread cutting trajectory of the threaded hole image obtained at a same angle using a line connecting a circle center of the nut and an entry point of thread cutting as a reference line for calculating the area difference.

12. The non-contact detection device according to claim 11, wherein the entry point of the thread cutting trajectory is an entry point via which a cutting tool taps the nut.

13. The non-contact detection device according to claim 10, wherein the area difference is represented by a pixel volume in the non-overlapped region obtained after the thread area comparison is performed.

14. The non-contact detection device according to claim 13, wherein analyzing the area difference comprises setting a pixel volume threshold, and determining that the structural deviation exists in the geometry of the thread if the area difference exceeds the pixel volume threshold.

15. The non-contact detection device according to claim 14, wherein setting the pixel volume threshold comprises recording the area differences from a batch of nuts and calculating the pixel volume threshold using statistical methods.

16. The non-contact detection device according to claim 15, wherein the pixel volume threshold is defined between a maximum of the area difference associated with a geometrically acceptable nut and a minimum of the area difference associated with the nut exhibiting the structural deviation in the geometry of the thread.

* * * * *